US010219211B2

(12) United States Patent
Sharma et al.

(10) Patent No.: US 10,219,211 B2
(45) Date of Patent: Feb. 26, 2019

(54) METHOD AND APPARATUS FOR ENABLING A NETWORK SELECTION DURING CHANGE IN A LOCATION OF A USER DEVICE

(71) Applicant: Samsung Electronics Co., Ltd, Gyeonggi-do (KR)

(72) Inventors: Chetan Sharma, Bangalore (IN); Alok Kumar Jangid, Bangalore (IN); Kailash Kumar Jha, Bangalore (IN); Mudit Goel, Bangalore (IN); Ravikumar Kalaimani, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 15/230,334

(22) Filed: Aug. 5, 2016

(65) Prior Publication Data
US 2017/0041866 A1   Feb. 9, 2017

(30) Foreign Application Priority Data

Aug. 5, 2015  (IN) ............................ 4078/CHE/2015
Aug. 2, 2016  (IN) ............................ 4078/CHE/2015

(51) Int. Cl.
*H04W 4/00* (2018.01)
*H04W 48/18* (2009.01)

(52) U.S. Cl.
CPC .................................. *H04W 48/18* (2013.01)

(58) Field of Classification Search
CPC ....... H04W 4/22; H04W 76/007; H04W 4/02; H04W 40/20; H04W 36/0022; H04W 36/12
See application file for complete search history.

(56) References Cited

U.S. PATENT DOCUMENTS

| | | | |
|---|---|---|---|
| 9,125,146 B1* | 9/2015 | Edara ..................... | H04W 48/16 |
| 2007/0042775 A1* | 2/2007 | Umatt .................... | H04W 48/16 455/434 |
| 2015/0139422 A1* | 5/2015 | Jover ..................... | H04W 12/04 380/270 |
| 2016/0345149 A1* | 11/2016 | Chuttani ................. | H04W 4/22 |

\* cited by examiner

*Primary Examiner* — Khalid W Shaheed

(57) ABSTRACT

A method for enabling a network selection during change in a location of a user equipment (UE) comprises of performing an emergency camping on a first PLMN during a change in location of the UE from a first network to a second network in a power ON mode, identifying a mobile country code and a mobile network code of the first available network from a system information block (SIB) detected from the first network during the emergency camping, determine whether a registered public land mobile network (RPLMN) of the UE is same as a network area of the first available network by comparing the identified MCC and MNC with information of a PLMN database stored in the UE, and determining at least one PLMN from a plurality of priority PLMNs of the second network from the PLMN database if the RPLMN is different from the network area of the first available network.

18 Claims, 3 Drawing Sheets

METHOD AND APPARATUS FOR ENABLING A NETWORK SELECTION DURING CHANGE IN A LOCATION OF A USER DEVICE

CROSS-REFERENCE TO RELATED APPLICATION(S) AND CLAIM OF PRIORITY

The present application is related to and claims the benefit under 35 U.S.C. § 119(a) of Indian Provisional Application No. 4078/CHE/2015 filed Aug. 5, 2015, and Indian Complete Application No. 4078/CHE/2015 filed Aug. 2, 2016, entitled "METHOD FOR QUICK SERVICE USING NEW METHODS", the entire disclosures of which are incorporated herein by reference.

TECHNICAL FIELD

The present disclosure relates to wireless devices and more specifically relates to a method and an apparatus for enabling a network selection during change in a location of a user device.

BACKGROUND

When a user equipment (UE) is powered on in new location or moves between different telecom circles, legacy behavior of the UE takes considerable amount of time to camp on a Network. With the technology revolution, it has become imperative for service providers and UE manufacturers to give user with a method using which the UE can quickly latch on to the network.

Traditionally as per 3GPP specification, whenever the UE is powered on, it needs to search for last Registered PLMN (RPLMN) on the available RATs. Typically, full band search on RPLMN for all the RATs typically take around 1.5 minutes. Whenever UE moves from one telecom circle to another telecom circle, the UE faces the problem of slow acquisition at boot-up. The UE unnecessary scans full band on RPLMN even though RPLMN is not present. Finally, it takes 2 to 3 Minutes for the UE to acquire service if user goes to a new telecom circle every time.

The root cause of the current UE behavior is that the UE location is uncertain in this case. The UE doesn't know that RPLMN is available at the current moment or not. Thus, the user faces delayed service especially during frequent travel. Further, the user faces unnecessary scan of last visited network, un-optimized algorithm for both domestic and international market, poor user experience, need for manual search and thus consuming more time, and therefore leading to battery draining.

Thus, there is need for a method for quick Service using new methods that can provide optimized method for both domestic and international market, better user experience, and thus avoid unnecessary scan of network, thereby reducing batter drain.

The above mentioned shortcomings, disadvantages and problems are addressed herein and which will be understood by reading and studying the following specification.

SUMMARY

To address the above-discussed deficiencies, it is a primary object to provide a method and an apparatus for enabling a network selection during change in a location of user equipment (UE).

The present disclosure provides optimized performance in cases where user changes its location from a last registered network.

According to an embodiment of the present disclosure, a method for enabling a network selection during change in a location of a user equipment (UE) comprises of performing, by the UE, an emergency camping on a first PLMN during a change in location of the UE from a first network to a second network in a power ON mode, identifying, by the UE, a mobile country code (MCC) and a mobile network code (MNC) of the first PLMN from a system information block (SIB) detected from the first network during the emergency camping, determine whether a registered public land mobile network (RPLMN) of the UE is same as a network area of the first PLMN by comparing the identified MCC and MNC with information of a PLMN database stored in the UE, and determining at least one second PLMN from a plurality of priority PLMNs of the second network from the PLMN database when the RPLMN is different from the first PLMN.

According to an embodiment of the present disclosure, the MCC and MNC are determined from a PLMN ID of the first PLMN on which the UE camps during an auto-camp mode. According to an embodiment of the present disclosure, during the auto-camp mode, the UE detects a system information block (SIB) without camping so as to obtain location information of the UE.

According to an embodiment of the present disclosure, the at least one second PLMN on which the UE avails a full service in the second network area is determined based on a roaming agreement of a first network operator of the first PLMN with a second network operator obtained from the PLMN database, wherein the PLMN database comprises detail information of a plurality of network areas associated with a plurality of network operators.

According to an embodiment of the present disclosure, a current location of the UE is used to determine a best match location of the UE in roaming mode and a corresponding PLMN for a home network operator.

According to an embodiment of the present disclosure, the detail information comprises at least one of, but not limited to, a MCC, a MNC, a network operator name, a PLMN ID, a user location, a network area/telecom circle, a roaming agreement with a home network operator, and the like.

According to an embodiment of the present disclosure, the method further comprises updating the PLMN database, where the PLMN database is updated based on one of, but not limited to, an over-the-air procedure as and when a new network operator is added in a network region, when an existing network operator area is added, deleted or updated, when roaming agreements between network operators are changed, when a new version of a maintain technical settings Table is released, and the like.

According to an embodiment of the present disclosure, the method further comprises of exchanging, by a first SIM of a multi-SIM embedded in the UE, location information with a second SIM in the multi-SIM during the emergency camping, where a network area derived from the first SIM is used by the second SIM.

According to an embodiment of the present disclosure, the first SIM gets a network service during an auto-camp mode. According to another embodiment of the present disclosure, the method further comprises selecting a SIM for enabling a PLMN service based on a priority of each PLMN.

According to an embodiment of the present disclosure, the network area refers to a country/sub region of a country.

The terms network area and telecom circle are used interchangeably in the description herein.

According to an embodiment of the present disclosure, a user equipment (UE) arranged for operation in a multi-network cellular environment and arranged for a network selection during change in a location of the UE, the UE comprises of one or more subscriber identity modules (SIMs) configured to access one or more corresponding PLMNs in a current location, a storage unit comprising a PLMN database, where the PLMN database is adapted to store one or more PLMN lists, and a processor configured to enable the network selection.

The network selection performed by the processor is adapted for performing an emergency camping on a first PLMN during a change in a location of the UE from a first network to a second network in a power ON mode, identifying a mobile country code (MCC) and a mobile network code (MNC) of the first PLMN from a system block information (SIB) detected from the first network during the emergency camping, determine whether a registered public land mobile network (RPLMN) of the UE is same as a network area of the first PLMN by comparing the identified MCC and MNC with information of the PLMN database, and determining at least one second PLMN from a plurality of priority PLMNs of the second network from the PLMN database if the RPLMN is different from a network area the first PLMN.

According to an embodiment of the present disclosure, the at least one second PLMN is at least one of a Home Public Land Mobile Network (PLMN), an equivalent HPLMN or any PLMN having a higher priority than a currently selected network.

The foregoing has outlined, in general, the various aspects of the invention and is to serve as an aid to better understanding the more complete detailed description which is to follow. In reference to such, there is to be a clear understanding that the present invention is not limited to the method or application of use described and illustrated herein. It is intended that any other advantages and objects of the present invention that become apparent or obvious from the detailed description or illustrations contained herein are within the scope of the present invention.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
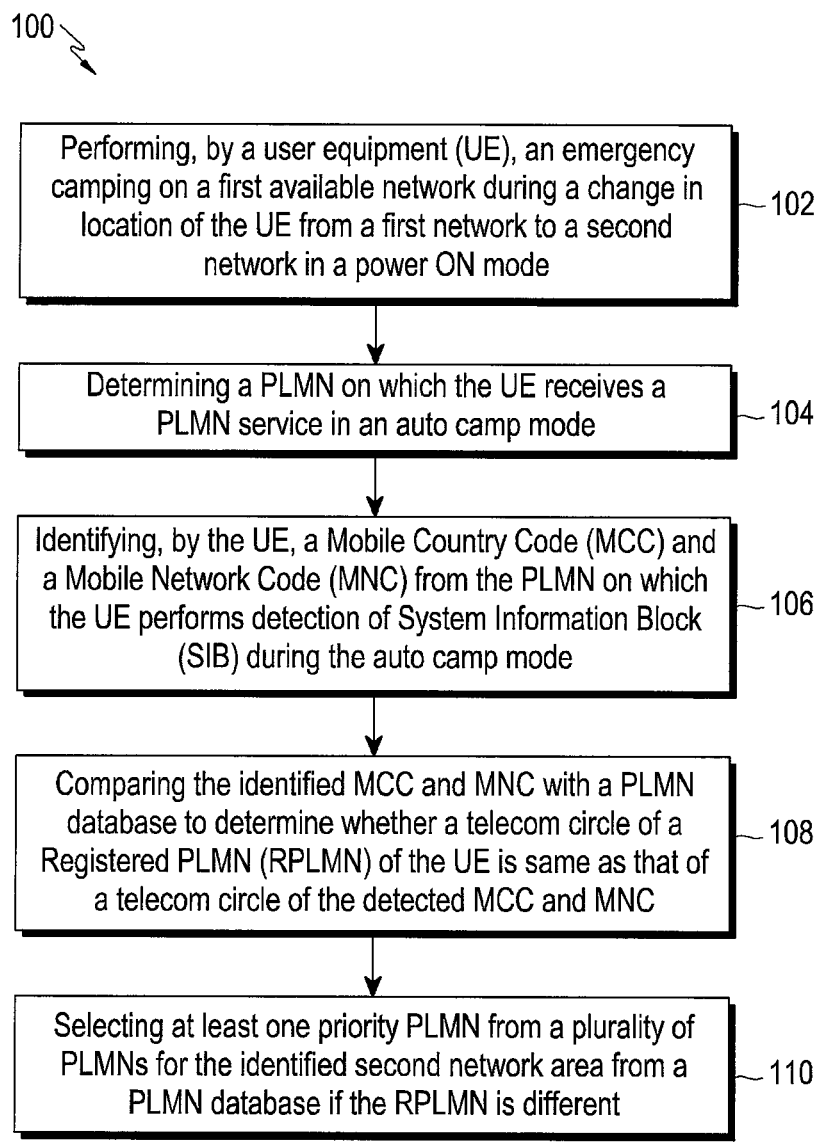
FIG. 1 is a schematic flow diagram illustrating a method for enabling a Public Land Mobile Network (PLMN) selection during change in a location of user equipment (UE), according to an embodiment of the present disclosure.
Figure 2:
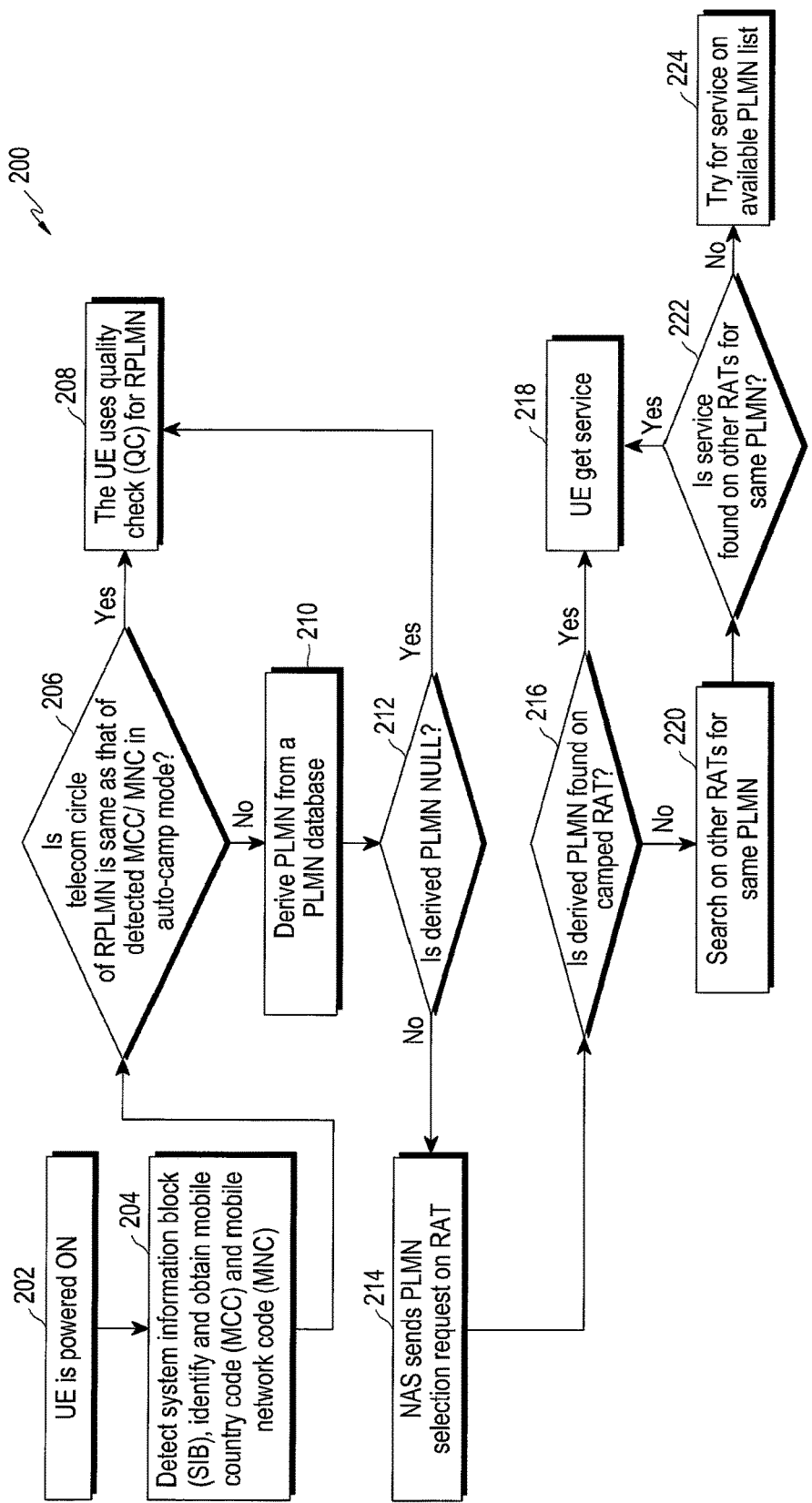
FIG. 2 is a schematic diagram illustrating a use case for a method for enabling a Public Land Mobile Network (PLMN) selection during change in a location of user equipment (UE), according to an embodiment of the present disclosure.
Figure 3:
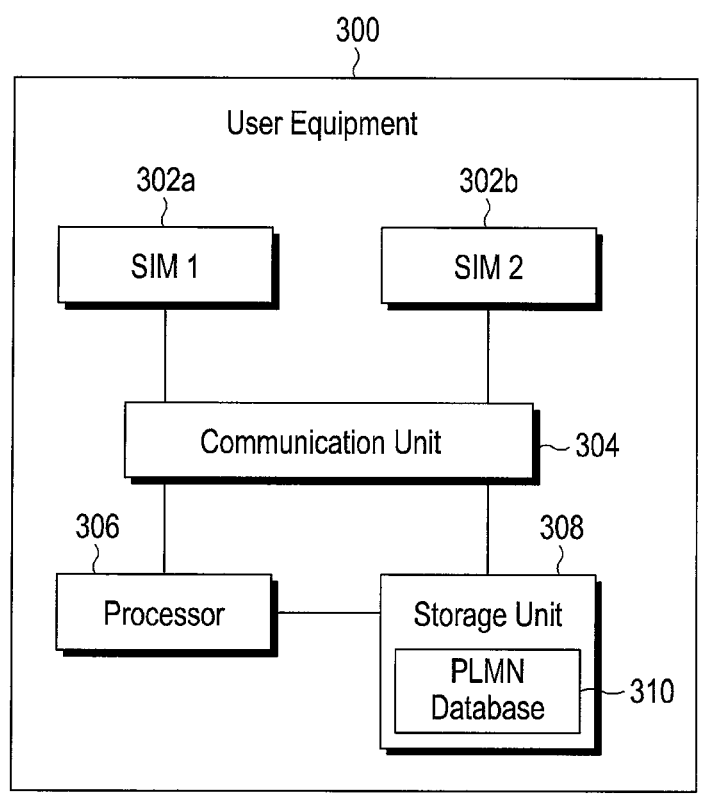
FIG. 3 is a block diagram illustrating a mobile communication device in accordance with an embodiment of the present disclosure.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure are described in detail with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Before detailing the present disclosure, some terms as used herein may be interpreted as follows, for example. However, it should be noted that the present disclosure is not limited thereto.

The various embodiments of the present disclosure disclose a system and method for enabling a Public Land Mobile Network (PLMN) selection during change in a location of user equipment (UE). In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following detailed description is, therefore, not to be taken in a limiting sense, and the scope of the present disclosure is defined only by the appended claims.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure provides a system and method for enabling a Public Land Mobile Network (PLMN) selection during change in a location of a user equipment (UE). The person having ordinarily skilled in the art can understand that the described embodiments use cases are for better understanding and illustration of the present disclosure, but not limit to scope of the present disclosure. The embodiments of the present disclosure are described with respect to user equipment (UE) that can be any of electronic devices such as, but not limited to, mobile phone, tablet, PDA, smart watch, and the like, and the person having ordinarily skilled in the art can understand that any of the electronic device with communication capabilities can be used, without departing from the scope of the disclosure.

According to an embodiment of the present disclosure, a method for enabling a Public Land Mobile Network (PLMN) selection during change in a location of user equipment (UE) is described herein. According to the present disclosure, the method comprises step of performing, by the user equipment (UE), an emergency camping on a first available network during a change in location of the user equipment (UE) from a first network to a second network in a power ON mode. A user of the UE moves from one location to another location. Currently, the UE is camped on the first network in first location. As the user of the UE moves to another location out of the coverage region of the network, the UE need to camp on another network for accessing services. Therefore, as soon as the UE moves to another location, during power ON mode, the UE performs emergency camping on the first available network. In an embodiment of the present disclosure, the first available network can be a public land mobile network (PLMN), without departing from the scope of the present disclosure.

Further, the method comprises step of determining the PLMN on which the UE can get a full service in an auto-camp mode. As soon the UE performs emergency camping and camped on the first available network, the UE starts searching all the public land mobile networks (PLMNs) for the available PLMN on which the UE can access the full service.

Further, the method comprises step of identifying, by the user equipment (UE), a Mobile Country Code (MCC) and a Mobile Network Code (MNC) from the PLMN on which the UE performs emergency camping. To complete the auto-camping, the UE accesses the information associated with the first available network or the PLMN on which the UE has performed emergency camping, and obtains Mobile Country Code (MCC) and a Mobile Network Code (MNC). In an embodiment of the present disclosure, the MCC and MNC are determined from the network on which the UE camps during emergency mode. In another embodiment of the present disclosure, the PLMN on which the UE avails full service in the second network area is determined based on a roaming agreement of the first network operator with the second network operator obtained from the PLMN database, without departing from the scope of the present disclosure.

Further, the method comprises step of comparing the identified MCC and MNC with a PLMN database to determine whether a Registered PLMN of the network area in an auto-camp mode of the UE is same as that of detected MCC and MNC. In an embodiment of the present disclosure, a current location of the UE is used to determine a best match location of the UE in roaming mode and a corresponding PLMN for a home network operator. Based on the identified MCC and MNC, the UE checks and compares the PLMN database to determine whether the registered PLMN of the network area in an auto-camp mode of the UE is same as that of detected MCC and MNC.

In an embodiment of the present disclosure, the PLMN database comprises details of a plurality of network areas associated with a plurality of network operators. In an embodiment of the present disclosure, the PLMN database details comprises at least one of, but not limited to, MCC, MNC, network operator name, PLMN, user location, roaming agreement between the network operators and network operator, and the like, without departing from the scope of the disclosure. In another embodiment of the present disclosure, the PLMN database can be present at the UE end and the database gets updated every time the UE camps on new PLMN. The person having ordinarily skilled in the art can understand how the UE accesses the PLMN database and obtains information related to the PLMNs, without departing from the scope of the disclosure.

In an embodiment of the present disclosure, the PLMN database can be enhanced in conjunction with either operator controlled PLMN (OPLMN) or user controlled PLMN (UPLMN) list so as to select the best PLMN match in the new location.

In an embodiment of the present disclosure, the PLMN database can be stored in storage units of the UE such as, but not limited to, SIM, external memory card, encrypting file system (i.e., efs) files, flat file, source code, and the like. In another embodiment of the present disclosure, the PLMN database can be stored in external servers from where it can be downloaded onto the user equipment. The person having ordinarily skilled in the art can understand that the PLMN database can be stored in any of the known storage units from where the UE can access the PLMN database and obtain necessary PLMN information, without departing from the scope of the disclosure.

In an embodiment of the present disclosure, the PLMN database stored in the user equipment can be manually updated by the user. In an embodiment of the present disclosure, the PLMN database stored in the device can be updated based on previous network reselection data.

Further, the method comprises step of selecting at least one priority PLMN from a plurality of PLMNs for the identified second network area from the PLMN database if a registered PLMN (RPLMN) is different. Based on the checking and comparison, the UE can identify which PLMN is suitable for camping and can be selected as the registered PLMN (RPLMN). During checking and comparison, if the UE identifies that the RPLMN is different than suitable PLMN, then the UE selects at least one priority PLMN from the plurality of PLMNs for the identified second network area from the PLMN database.

In an embodiment of the present disclosure, the method further comprises steps of updating the PLMN database, where the PLMN database is updated based on at least one of, but not limited to, an over-the-air procedure as and when a new network operator is added in a network region, when an existing network operator area is added, deleted or updated, when roaming agreements between the network operators are changed, when a new version of the SE13 (Maintain Technical Settings) Table is released, and the like, without departing from the scope of the disclosure.

In an embodiment of the present disclosure, in case of multi SIM UE, the method further comprises steps of exchanging, by a first SIM of a multi-SIM UE, location information with a second SIM during a quick camping in the multi-SIM UE, wherein a network area derived from a first SIM card is used by a second SIM card. In an embodiment of the present disclosure, the first SIM is the SIM which gets the network service first during an auto-camp mode, without departing from the scope of the disclosure.

In an embodiment of the present disclosure, in the Multi SIM UE, the user can select the SIM on which the service needs to be attained on priority, wherein the selection of the SIM to get first service can be with the Subscription where the number of bands/RAT support is minimum. In an embodiment of the present disclosure, if one SIM is in HOME operator coverage and other SIM is in Roaming coverage then the preference shall be given to the HOME SIM selection.

The present method for enabling a Public Land Mobile Network (PLMN) selection of user equipment (UE) is triggered during, but not limited to, UE power up, the Airplane mode in turned OFF, the UE comes to in-service from Out of service (OOS) area, manual selection by the user, manual selection by the user by selecting the telecom circle via a UI, the user goes from one telecom circle to another, and the like.

In a mobile communication system, a user with user equipment (UE) can be travelling from his home network to a roaming network (Ex: across State/Country boundaries) or vice-versa, wherein the user is moving from a city A, registered on public land mobile network (PLMN)-A, and moving to a city B. It takes quite some time for the UE to register onto a network that can provide a service, as a new PLMN in the city B are not known and the UE has to scan all the frequencies it supports on which it can possibly find service. The full network scan takes quite some time depending on the Radio Access Technology (RAT) that the UE supports. Also, not only this precipitates a bad user experience, including cases where user might perform full manual scan, it also takes a toll on the battery life and eventually affects the UE's performance. With the advent of technology and more people travelling across places, this becomes a crucial problem entailing bad user experience.

FIG. 1 is a schematic flow diagram 100 illustrating a method for enabling a Public Land Mobile Network (PLMN) selection during change in a location of user equipment (UE), according to an embodiment of the present disclosure.

According to FIG. 1, in operation 102, the UE performs an emergency camping on a first available network during a change in location of the user equipment from a first network to a second network in a power ON mode. In operation 104, the UE determines the PLMN on which the UE can get a full service in an auto camp mode.

Further, in operation 106, the UE identifies a Mobile Country Code (MCC) and a Mobile Network Code (MNC) from a PLMN ID of the PLMN on which the UE performs emergency camping. In operation 108, the UE compares the identified MCC and MNC with a PLMN database stored in the UE to determine whether a Registered PLMN (RPLMN) of the network area in the auto-camp mode of the UE is same as that of the detected MCC and MNC. Further, in operation 110, the UE selects at least one priority PLMN from a plurality of PLMNs for the identified second network area from a PLMN database if the RPLMN is different.

FIG. 2 is a schematic diagram 200 illustrating a use case for a method for enabling a Public Land Mobile Network (PLMN) selection during change in a location of user equipment (UE), according to an embodiment of the present disclosure.

According to FIG. 2, in operation 202, the UE is powered on in a new location. In an embodiment of the present disclosure, the UE can be already in powered on mode, without departing from the scope of the disclosure. In operation 204, the UE uses any of the known technique to perform emergency auto-camp on the PLMN. During an auto-camp mode, the UE detects system information block (SIB) to identify and obtain information such as, but not limited to, mobile country code (MCC), mobile network code (MNC), and the like that are associated with the PLMN or registered PLMN (RPLMN) on which the UE has camped on emergency basis. The various information that the UE can obtain from the SIB is described herein above and thus not described again to avoid repetition.

Further, in operation 206, the UE checks whether telecom circle of the RPLMN on which the UE has camped on is same as that of the detected MCC and MNC in the auto camp mode. If yes, then in operation 208, the UE uses any of the known quality check (QC) method for checking the quality of the RPLMN. If no, then in operation 210, the UE accesses its PLMN database and derive available PLMNs in the current location. In operation 212, the UE checks whether the derived PLMN is null. If yes, then the process moves to operation 208, wherein the UE selects the PLMN as the RPLMN and uses any of the known quality check (QC) method for checking the quality of the RPLMN.

If no, then in operation 214, a non-access stratum (NAS) layer of the UE sends PLMN selection request on the derived PLMN from the PLMN database on radio access technology (RAT) on which the UE detected in the auto-camp mode. In operation 216, the UE checks whether the derived PLMN is found on the camped RAT. If yes, then in operation 218, the UE gets a service and starts accessing the service over the selected PLMN/RPLMN. If no, then in operation 220, the UE continues searching for PLMN on other RATs. In operation 222, the UE checks whether a service is found on other RATs for PLMN. If yes, then the process moves to operation 218 and UE gets a service and starts accessing the service over the selected PLMN/RPLMN. If no, then in operation 224, the UE continues trying for a service on available PLMN list.

FIG. 3 is a block diagram illustrating a mobile communication device/user equipment (UE) 300 in accordance with an embodiment of the present disclosure.

According to FIG. 3, the UE 300 can be configured to comprise of two subscriber identity modules (SIMs) SIM1 302a and SIM2 302b, a communication unit 304, a processor 306, and a storage unit 308, wherein the storage unit 308 comprises of a PLMN database 310.

In an embodiment, the UE 300 is a dual SIM device with two SIMs, SIM1 302a and SIM2 302b and can access two same or different networks. The SIMs, SIM1 302a and SIM2 302b attempt to camp on a PLMN, and transmit and receive signals within the coverage of the PLMN. In an embodiment of the present disclosure, the UE 300 can comprise a single SIM. In an embodiment of the present disclosure, the UE 300 can comprise multi-SIM with more than one SIM with each SIM accessing same or different PLMNs respectively, without departing from the scope of the disclosure.

Further, when the UE 300 is moved to a new location, the processor 306 performs emergency camping on a first available network. In an embodiment of the present disclosure, the UE 300 is in a power ON mode during moving to the new location. Further, the UE 300 comprises of the storage unit 308 that stores the PLMN database 310 and other information related to the UE 300, wherein the PLMN database 310 comprises details of a plurality of network areas associated with a plurality of network operators. In an embodiment of the present disclosure, the storage unit 308 can be at least one of the, but not limited to, SIM, external memory card, encrypting file system (efs) files, flat file, source code, and the like. In an embodiment of the present disclosure, the PLMN database 310 details comprises at least one of, but not limited to, MCC, MNC, network operator name, PLMN, user location, roaming agreement between the network operators and network operator, and the like.

Based on accessing the PLMN database 310 from the storage unit 308, the processor 306 determines a PLMN on which the UE can get a full service in an auto-camp mode, and identifies a Mobile Country Code (MCC) and a Mobile Network Code (MNC) from a PLMN ID of the PLMN on which the UE performs emergency camping. Further, the processor 306 compares the identified MCC and MNC with a PLMN database to determine whether a Registered PLMN of the network area in an auto-camp mode of the UE is same as that of the detected MCC and MNC, and selects at least one priority PLMN from a plurality of PLMNs for the identified second network area from a PLMN database if the RPLMN is different.

The present embodiments have been described with reference to specific example embodiments; it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

Although the embodiments herein are described with various specific embodiments, it will be obvious for a person skilled in the art to practice the invention with modifications. However, all such modifications are deemed to be within the scope of the claims. It is also to be understood that the following claims are intended to cover all of the generic and specific features of the embodiments described herein and all the statements of the scope of the embodiments which as a matter of language might be said to fall there between.

What is claimed is:

1. A method of enabling a network selection during change in a location of a user equipment (UE), the method comprising:
   identifying, by the UE, a mobile country code (MCC) and a mobile network code (MNC) of a first public land mobile network (PLMN) based on a system information block (SIB) received from a second network during a change in location of the UE from a first network to the second network in a power ON mode, wherein the first PLMN is predicted to be available in the second network;
   comparing the identified MCC and the identified MNC with an MCC and a MNC of a second PLMN registered in a PLMN database stored in the UE;
   accessing, by the UE, the second network based on the MCC and the MNC of the second PLMN if the MCC and the MNC of the second PLMN is a same as the identified MCC and the identified MNC; and
   determining, by the UE, a MCC and a MNC of a third PLMN based on a priority among a plurality of PLMNs related to the second network from the PLMN database and accessing the second network based on the MCC and the MNC of the third PLMN if the MCC and the MNC of the second PLMN is different from the identified MCC and the identified MNC.

2. The method of claim 1, wherein the third PLMN on which the UE avails a full service in the second network is determined based on a roaming agreement of a network operator of the second network with a home network operator obtained from the PLMN database.

3. The method of claim 1, wherein a current location of the UE is used to determine a best match location of the UE in roaming mode and a corresponding PLMN for a home network operator.

4. The method of claim 1, wherein the PLMN database comprises detail information of a plurality of network areas associated with a plurality of network operators.

5. The method of claim 4, wherein the detail information comprises at least one of the identified MCC, the identified MNC, the MCC and the MNC of the second PLMN, the MCC and the MNC of the third PLMN, a network operator name, a PLMN ID, a user location, a network area, and a roaming agreement with a home network operator.

6. The method of claim 1, further comprising updating the PLMN database, where the PLMN database is updated based on one of:
   an over-the-air procedure as and when a new network operator is added in a network region, when an existing network operator area is added, deleted or updated, when roaming agreements between network operators are changed, and when a new version of a maintain technical settings table is released.

7. The method of claim 1, further comprising:
   exchanging, by a first SIM of a multi-SIM embedded in the UE, a location information with a second SIM in the multi-SIM during an emergency camping, where a network area derived from the first SIM is used by the second SIM.

8. The method of claim 7, wherein the first SIM gets a network service during an auto-camp mode.

9. The method of claim 1, further comprising selecting a SIM for enabling a PLMN service based on the priority among the plurality of PLMNs.

10. A user equipment (UE) arranged for operation in a multi-network cellular environment and arranged for a network selection during change in a location of the UE, the UE comprises of:
one or more subscriber identity modules (SIMs) configured to access one or more corresponding public land mobile networks (PLMNs) in a current location;
a storage unit configured to store a PLMN database, where the PLMN database is adapted to store one or more PLMN; and
a processor configured to:
identify a mobile country code (MCC) and a mobile network code (MNC) of a first PLMN based on a system block information (SIB) received from a second network during a change in location of the UE from a first network to the second network in a power ON mode, wherein the first PLMN is predicted to be available in the second network;
compare the identified MCC and the identified MNC with an MCC and a MNC of a second PLMN registered in a PLMN database stored in the UE;
access the second network based on the MCC and the MNC of the second PLMN, if the MCC and the MNC of the second PLMN is a same as the identified MCC and the identified MNC; and
determine an MCC and a MNC of a third PLMN based on a priority among a plurality of PLMNs related to the second network from the PLMN database and access the second network based on the MCC and the MNC of the third PLMN if the MCC and the MNC of the second PLMN is different from the identified MCC and the identified MNC.

11. The UE of claim 10, wherein the third PLMN on which the UE avails a full service in the second network is determined based on a roaming agreement of a network operator of the second network with a home network operator obtained from the PLMN database.

12. The UE of claim 10, wherein the current location of the UE is used to determine a best match location of the UE in roaming mode and a corresponding PLMN for a home network operator.

13. The UE of claim 10, wherein the PLMN database comprises detail information of a plurality of network areas associated with a plurality of network operators.

14. The UE of claim 13, wherein the detail information comprises at least one of the identified MCC, the identified MNC, the MCC and the MNC of the second PLMN, the MCC and the MNC of the third PLMN, a network operator name, a PLMN ID, a user location, a network area, and a roaming agreement with a home network operator.

15. The UE of claim 10, wherein the processor is further configured to update the PLMN database, where the PLMN database is updated based on one of:
an over-the-air procedure as and when a new network operator is added in a network region, when an existing network operator area is added, deleted or updated, when roaming agreements between network operators are changed, and when a new version of a maintain technical settings table is released.

16. The UE of claim 10, wherein the one or more SIMs comprises of a first SIM and a second SIM, and the first SIM is configured to exchange a location information with the second SIM during an emergency camping, where a network area derived from the first SIM is used by the second SIM.

17. The UE of claim 16, wherein the first SIM gets a network service during an auto-camp mode.

18. The UE of claim 10, wherein the processor is configured to select a SIM for enabling a PLMN service based on the priority among the plurality of PLMNs.

* * * * *